United States Patent
Alsäter et al.

(10) Patent No.: US 9,119,338 B2
(45) Date of Patent: Sep. 1, 2015

(54) AGRICULTURAL MACHINERY AND PROCEDURE FOR SUCH

(75) Inventors: Johan Alsäter, Gränna (SE); Jörgen Dahl, Ödeshög (SE)

(73) Assignee: Väderstad-Verken AB (SE)

( * ) Notice: Subject to any disclaimer, the term of this patent is extended or adjusted under 35 U.S.C. 154(b) by 82 days.

(21) Appl. No.: 14/000,348

(22) PCT Filed: Jan. 25, 2012

(86) PCT No.: PCT/SE2012/050072
§ 371 (c)(1),
(2), (4) Date: Aug. 19, 2013

(87) PCT Pub. No.: WO2012/115563
PCT Pub. Date: Aug. 30, 2012

(65) Prior Publication Data
US 2013/0327260 A1 Dec. 12, 2013

(30) Foreign Application Priority Data
Feb. 23, 2011 (SE) ........................................ 1150156

(51) Int. Cl.
| | |
|---|---|
| *A01B 69/00* | (2006.01) |
| *A01B 79/02* | (2006.01) |
| *A01C 7/00* | (2006.01) |
| *A01C 21/00* | (2006.01) |
| *A01C 7/06* | (2006.01) |
| *A01B 79/00* | (2006.01) |
| *A01C 15/00* | (2006.01) |

(52) U.S. Cl.
CPC .................. *A01C 7/06* (2013.01); *A01B 69/007* (2013.01); *A01B 79/005* (2013.01); *A01C 7/00* (2013.01); *A01C 15/00* (2013.01); *A01C 21/00* (2013.01); *A01C 21/005* (2013.01)

(58) Field of Classification Search
CPC ...... A01B 79/02; A01B 69/00; A01B 69/007; A01B 79/005; A01B 79/00; A01C 7/00; A01C 21/00; A01C 7/06; A01C 15/00; A01C 21/005
See application file for complete search history.

(56) References Cited

U.S. PATENT DOCUMENTS

| | | |
|---|---|---|
| 5,077,653 A | 12/1991 | Barlet |
| 5,337,959 A | 8/1994 | Boyd |
| 6,070,539 A | 6/2000 | Flamme et al. |

FOREIGN PATENT DOCUMENTS

| | | |
|---|---|---|
| DE | 102005011004 | 9/2006 |
| EP | 0726024 | 8/1996 |

(Continued)

OTHER PUBLICATIONS

International Search Report and Written Opinion for International Application No. PCT/SE2012/050072, mail date Mar. 21, 2012, 10 pages.

(Continued)

*Primary Examiner* — Christopher J Novosad
(74) *Attorney, Agent, or Firm* — Foley & Lardner LLP

(57) ABSTRACT

Agricultural machinery and procedure for an agricultural machinery (11) that comprises metering devices (B1, B2, Bn) placed laterally in the agricultural machinery so as to provide a number of parallel metering rows (n), each one of the metering devices (Bn) being connected to at least one control unit (22) for the individual control of each metering device, the control unit (22) receiving a first signal, which acts on the control unit (22) to either start or stop the metering from the laterally outermost positioned and activated metering devices (B1), the control unit (22) receiving a second signal, which acts on the control unit (22) to either start or stop the metering from at least one of the laterally activated second outermost positioned metering devices or groups, the calculation unit, with the aid of the instant of time of the first signal and the instant of time of the second signal as well as the speed of the agricultural machinery, calculating the individual instants of time of start or stop of the metering from each one of the remaining metering devices.

20 Claims, 3 Drawing Sheets

(56) References Cited

FOREIGN PATENT DOCUMENTS

| | | |
|---|---|---|
| EP | 1415523 | 5/2004 |
| GB | 2039202 | 8/1980 |
| WO | WO 2010/078642 | 7/2010 |

OTHER PUBLICATIONS

International Preliminary Report on Patentability for International Application No. PCT/SE2012/050072, issued Aug. 27, 2013, 7 pages.

AGRICULTURAL MACHINERY AND PROCEDURE FOR SUCH

TECHNICAL FIELD

The present invention relates to agricultural machineries and particularly to so-called "planters" in which metering devices for, among other things, the metering of seeds is made by a singulation of seeds to drop the same in a drill furrow. The invention is extraordinarily suitable in agricultural machineries that are provided with several types of metering devices, for example for seeds, for fertilizer and for biocide agent.

BACKGROUND OF THE INVENTION

In many "planters", i.e., planters that are provided with singulation devices for metering separate seeds, it is today possible to sow seeds, dispense fertilizer and to dispense biocide agent. For each one of these, there is some form of container, a driven metering device, and outlet. For seeds, and most often for fertilizer, there is also some form of "furrow-creating" means such as a disc share. The containers may be individually arranged for each drill row or centrally arranged for the supply to several drill rows.

It is known to drive the metering electrically or hydraulically. It is possible to have a common driving device for all metering devices. Individual driving of each individual seed metering device is known by EP1415523 and GB2217043.

Upon shut off of the metering in case of, for instance, end of a field, all units are shut off simultaneously. Since these physically are at different positions in the agricultural machinery and accordingly in the field, this entails deviations of the relation between fertilizer, seeds and biocide agent at the end of the respective row. Conversely, this also applies upon initiation. Manual disabling of each function in a time-displaced way does not feel practically possible or realistic considering that an agricultural machinery may have over 40 drilling units, which implies over 100 metering units if units for fertilizer and biocide agent also exist.

In certain cases, the passages can be terminated with a wedge-shaped sector depending on how the geometries of the field allotments in question look like. If several rows then are shut off simultaneously, either areas with double or no metering are received, in addition to the problems mentioned above at row ends that also occur. No one of these cases is desirable. In double metering, overdosage results, which often causes inferior emergence and increased cost. In the absence of metering, the emergence does not occur at all.

THE OBJECT OF THE INVENTION

The object of the invention is to provide a procedure for an agricultural machinery that allows a control of the metering so that the problems mentioned above largely are eliminated.

The object is furthermore to provide an agricultural machinery that comprises devices to allow a procedure for the control of the metering so that the problems mentioned above largely are eliminated.

An additional object is to provide an automatization of start and stop of the included metering devices depending on the geometry of the cultivation area, i.e., the field.

SUMMARY OF THE INVENTION

By the present invention, as the same appears in the independent claims, the above-mentioned objects are met, said disadvantages having been eliminated. Suitable embodiments of the invention are defined in the dependent claims.

According to the invention, features are used that allow individual shut off (stop) and individual initiation (start) at desired position in the fields. The features comprise at least one individually driven seed metering device and either at least one individually driven fertilizer metering device or at least one individually driven biocide agent metering device. However, the invention will do justice to itself when the metering devices of several rows are used simultaneously. The metering devices for the seeds correspond to those that are previously known in a planter, i.e., singulation devices. Such metering devices may also be used for the fertilizer agent and for the biocide agent depending on the form of the agents. The features of the invention also comprise that each metering device is connected to a control unit, which individually can control each separate metering device. Furthermore, each metering device for fertilizer and each metering device for biocide may be controlled in a predetermined way to change the respective metering rate depending on the metering rate of a given seed metering device or vice versa, i.e., that the metering rate of a seed metering device is changed depending on the metering rate of the fertilizer or biocide, where the change may be displaced in time or travel distance. The changed metering rate does not necessarily need to be only off/on but may be an optional increase or decrease. Furthermore, each fertilizer metering device, each seed metering device and each biocide metering device may be individually controlled in a predetermined way to change the respective metering rate depending on a current GPS position indicated by a GPS receiver connected to the agricultural machinery. Also in this case, the changed metering rate does not necessarily need to be only off/on but may be an optional increase or decrease. This automatic control of the meterings may in addition be supervised manually.

Thus, it is feasible to connect the agricultural machinery and its procedure of metering to a GPS function wherein the position and shape of the field are stored. Occasionally, it is desirable to change the batching for some one of the functions fertilizer and/or biocide in a part of the field, for instance in an area where the ground conditions are such that the emergence of weeds is extraordinarily extensive and which then requires changed dosage of fertilizer and/or biocide agent, which may be pesticides or insecticides.

There is also a time shift between a metering device and the outlet of the metering device at the ground, wherein the time shift between start and stop, respectively, of each metering device can be set so that agent/granulated material that is positioned after the metering device but not had had time to reach the outlets at ground level is taken into consideration, or conversely upon initiation.

The invention concerns a procedure for an agricultural machinery that comprises a main group of metering devices of singulation type comprising at least two electrically controlled metering devices, which are placed laterally in the agricultural machinery so as to provide a number of parallel metering rows. The metering rows are also denominated drill rows or drill furrows. Each one of the metering devices is connected to at least one control unit for the individual control of each metering device or subgroup of metering devices. To the control unit, a calculation unit is connected, the control unit receiving a first signal, which acts on the control unit to either start or stop the metering from at least one or at least a subgroup of the laterally outermost positioned and activated metering devices, whereupon the control unit receives a second signal, which acts on the control unit to either start or stop the metering from at least one or at least a subgroup of the laterally activated second outermost positioned metering devices or groups, the calculation unit, with the aid of the instant of time of the first signal and the instant of time of the second signal as well as the speed of the agricultural machinery, calculating the individual instants of time of start or stop of the metering from each one of the remaining metering devices or groups of metering devices in the agricultural machinery, the control unit individually executing the start or stop of the respective metering of said devices. These two signals to the control unit may be seen as activation signals, which result in execution signals from the control unit to the respective metering device.

In one embodiment of the invention, the main group of the agricultural machinery consists of metering devices of solely the seed metering type, i.e., the invention relates to a sowing machine provided with solely precision sowing units. By controlling these according to the procedure, unsown and double sown cultivation surfaces are eliminated.

In one embodiment of the invention, the agricultural machinery further comprises at least one main group of electrically controlled metering devices, which main group is placed in front of or behind the existing main group in relation to the direction of travel so that each metering row receives metering from all main groups. The calculation unit receives additional signals, with the aid of the instant of time of the first signal and the instant of time of the second signal, which additional signals originate from metering devices of the additional main group that is placed in front in the direction of travel of the agricultural machinery, the speed of the agricultural machinery, and the distance between the metering row-related metering devices of the main groups, the calculation unit calculating the individual instants of time of start or stop of the metering from each one of the remaining metering devices or groups of metering devices in the agricultural machinery. The control unit then individually executes the start or stop of the respective metering of said devices.

In one embodiment of the invention, the additional main group consists of fertilizer metering devices. This embodiment allows that both precision sowing units and units for the fertilizer can be controlled to deliver agent at a suitable distance in relation to the respective drill furrow.

In one embodiment of the invention, an additional main group consists of biocide agent metering devices. This embodiment allows that precision sowing units, units for biocide agent and units for the fertilizer can be controlled to deliver agent on essentially the same spot in the same drill furrow.

In one embodiment of the invention, a metering device from each main group provides for metering to only one metering row. Thus, agricultural machineries according to this embodiment are provided with separate metering devices on one hand for each drill furrow and on the other hand for each type of agent.

In one embodiment of the invention, the agricultural machinery comprises a dosage unit that receives a dosage signal that depends on the speed of the agricultural machinery from the control unit, the dosage unit regulating the delivered amount of agent from the metering devices in relation to the speed of the agricultural machinery. The embodiment contributes to providing a constant amount of agent per unit of length in the respective drill furrow independently of the speed.

In one embodiment of the invention, the dosage unit is controlled manually or automatically to increase or decrease the delivered amount of agent from the metering devices independently of the speed of the agricultural machinery. This embodiment allows that certain portions of the cultivation area receive more or less agent per unit of length in the respective drill furrow.

In one embodiment of the invention, the dosage unit is automatically actuated for a generally higher or a generally lower metering by it receiving stored information about the location and shape of the area under cultivation and the nature of the soil in co-operation with present data from a GPS receiver connected to the dosage unit. This embodiment allows that certain portions of the cultivation area automatically receive more or less agent per unit of length in the respective drill furrow by data of the cultivation area in question being co-ordinated with real-time data from the GPS receiver and processed for a control of the dosage unit.

In one embodiment of the invention, the first and the second signal are sent manually for execution to the control unit by the driver of the agricultural machinery.

The embodiment involves that the driver observes when the first metering device reaches the position for start/stop of metering and then sends a signal to the control unit, after which the driver observes when the second metering device reaches the position for start/stop of metering and then again sends a signal to the control unit. Thereupon, other signals are calculated for the execution of the respective start/stop of metering.

In one embodiment of the invention, the first and the second signal are sent automatically for execution to the control unit from the calculation unit that has calculated individual start/stop of each metering unit with the aid of stored information about the location and shape of the area under cultivation co-operating with present data from a GPS receiver connected to the calculation unit. Thus, this embodiment is an automatization of the meterings so that the driver does not need to observe any metering devices at all.

The invention also concerns an agricultural machinery that comprises at least two electrically controlled metering devices at least one of which is a singulation device for seeds. The metering from the metering devices of said agricultural machinery is started or stopped according to any one of the indicated procedures.

In one embodiment of the agricultural machinery, it comprises a dosage unit that is arranged to regulate the delivered amount of agent.

In one embodiment of the agricultural machinery, it also contains metering devices for fertilizer and/or for biocide agent.

In one embodiment of the agricultural machinery, it is towed by a traction vehicle, for instance a tractor.

BRIEF DESCRIPTION OF THE DRAWINGS

Now, the invention will be described in more detail, reference being made in connection with the accompanying drawing figures.

DESCRIPTION OF THE INVENTION

Figure 1:
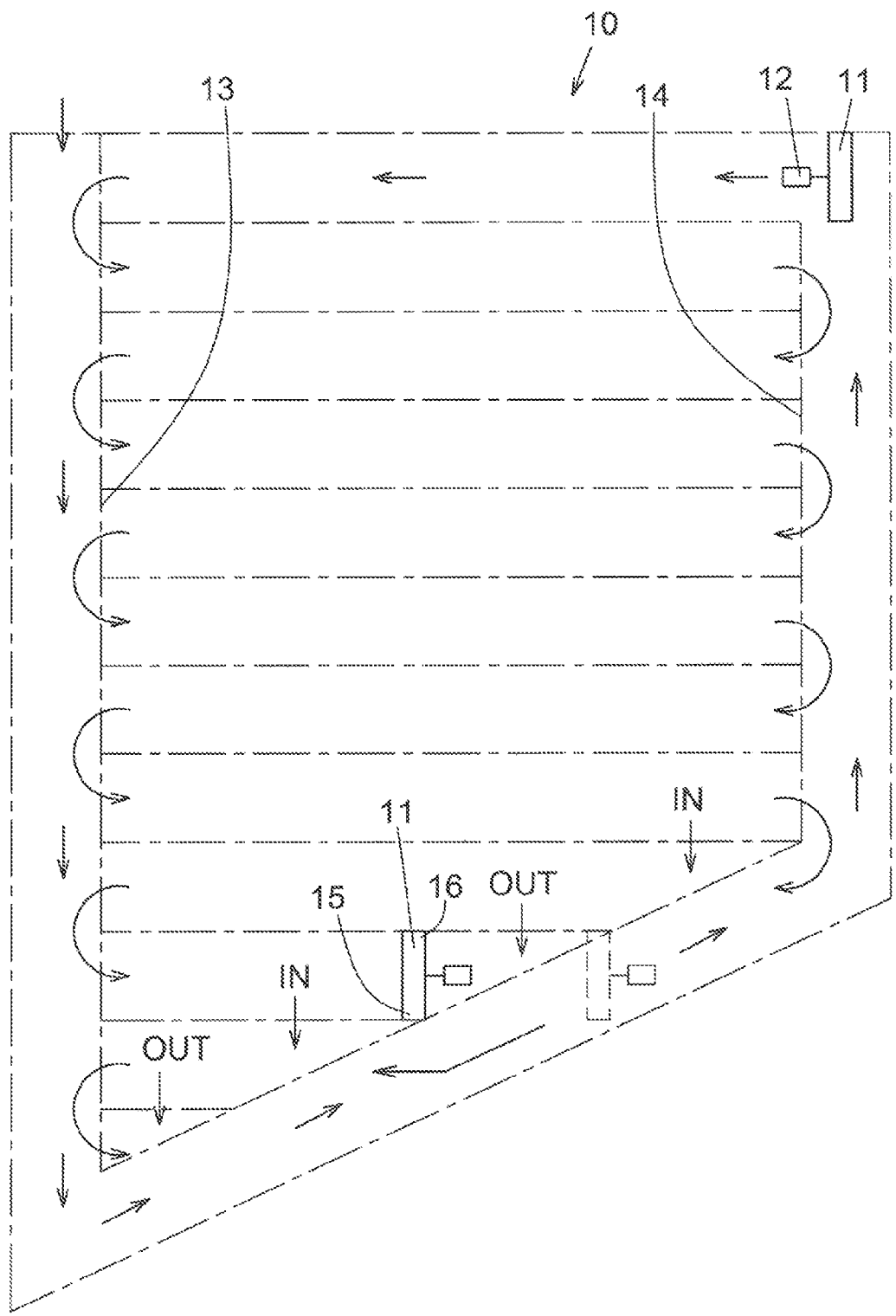
FIG. 1 shows an explanatory sketch of a possible mode of operation for the driving of an agricultural machinery across the geometry of a cultivation area.

FIG. 1 shows a cultivation area 10 across which an agricultural implement 11 is towed by a tractor 12. The agricultural implement 11 is a planter, which simultaneously leaves seeds from drilling units to a number of drill furrows in the ground. In order to sow the entire cultivation area, the agricultural implement 11 is towed according to a preselected pattern depending on the shape of the cultivation area. As is seen in the figure, the agricultural implement is towed across the area such as the arrows show. In doing so, the sowing begins where the arrow enters the so-called the headland, i.e., up to the left in the figure. By the fact that the shown headland around the area after one turn already is sown, it means that the drilling units have to be stopped and started, respectively, at the semicircular arrows unless double sowing should occur. As long as the planter only comprises drilling units and these can be shut off and be turned on simultaneously at the vertical limiting lines 13, 14 of the sowing surface of the area, there are no problems since this has been made previously, however with a certain overlapping or a certain unsown surface. On the other hand, if the drilling units of the planter are supplemented with each an additional fertilizer unit and/or unit for biocide agent where said additional units are placed in the machine displaced along the drill furrow and possibly also laterally, this means that, upon conventional start and stop of the units, there will be formed empty cultivation surfaces alternatively cultivation surfaces processed twice. This occurs when metering is started, as well as when metering is interrupted, because of the different longitudinal positions of the units in the machine.

In addition, the complex of problems increases when the machine arrives to the position IN, "into an oblique surface" and the position OUT, "out from an oblique surface", which positions are shown at the bottom of the figure. In the position OUT, the metering units of the agricultural implement 11 placed at one side 15 thereof should be shut off already in the shown position, while the units at the other side 16 thereof should be shut off not until that side reaches the dashed position of the agricultural implement 11. Next, the conveyance is turned and run along the angled arrow into the position IN, wherein start of the metering units follows at different instants of time.

Above, there has been described a possible way to drive the agricultural implement, but other ways are naturally possible within the scope of the invention.

Figure 2:
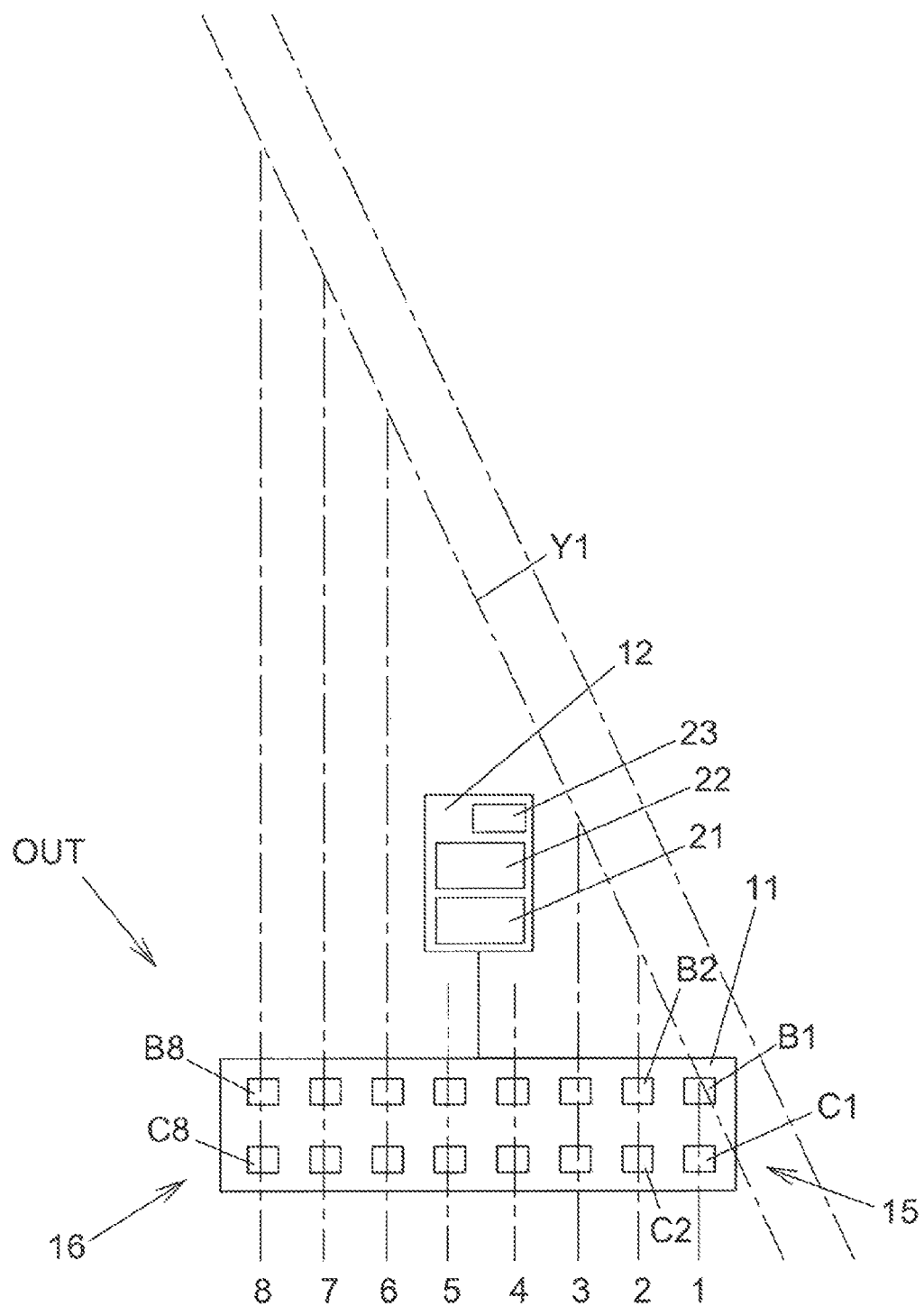
FIG. 2 shows a partial enlargement from FIG. 1 according to one embodiment of the invention.

The present invention is also applicable to agricultural machineries that only are provided with a number of metering units of the same type, for instance only seed metering units, when the metering is carried out along straight drill rows that connect to drill rows at an angle deviating from 90°, for instance for drill rows according to FIG. 2.

FIG. 2 shows in an enlargement from FIG. 1 more clearly the position of each seed metering device B1-B8 and each biocide agent metering device C1-C8, where the metering devices C1-C8, B1-B8 are placed on the metering rows 1-8 (also denominated "drill furrow" or "drill row") when the agricultural implement 11 towed by the tractor 12 reaches the position "out from oblique surface", OUT, i.e., that the metering device B1 at the drill furrow 1 reaches the bordering drill furrow Y1. The seed metering device B1 on drill row 1 at one side 15 of the agricultural implement is first shut off and then the biocide agent metering device C1 on drill row 1 is shut off. Next, the seed metering device B2 on drill row 2 will reach up to the oblique drill row Y1 and is shut off, after which the biocide agent metering device C2 on drill row 2 reaches the drill row Y1 and is shut off, and so on until the biocide agent metering device C8 on drill row 8 at the other side 16 of the agricultural implement reaches the drill row Y1 and is shut off. In this embodiment example of the agricultural machinery, the same contains two different main groups of metering units Cn, Bn, for biocide agent as well as for seeds, for each drill row n, where $1 \leq n \leq 8$. The distance between each row is usually 35-80 cm.

Thus, the invention comprises a number of metering devices, which may be individually controlled electrically both as regards metered quantity/unit of time by a dosage unit 21, and start and stop, respectively, of the metering by a control unit 22. In the shown embodiment example according to FIG. 2, the agricultural machinery embraces two types of metering devices, at least one of the seed metering devices of which receives a first signal for start or stop of the metering, and at least another of the seed metering devices of which receives a second signal for start or stop of the metering. In regard to these signals, a calculation unit 23 preferably calculates according to the equation of the straight line, $y=kx+m$, and the speed as well as the distances between the respective B-device and the respective C-device when each one of the metering devices reaches the bordering drill row Y1 in order to then start or stop the metering from the respective metering device.

The invention also embraces the possibility of grouping the metering devices for a control in groups. In such an embodiment, the metering devices C1, B1, C2, B2 may be a first subgroup, while the metering devices C3, B3, C4, B4 are a second subgroup, and so on. In such a case, the agricultural machinery according to FIG. 2 would consist of four subgroups, where the fourth subgroup C7, B7, C8, B8 and the first subgroup C1, B1, C2, B2 are the laterally outermost situated subgroups.

Figure 3:
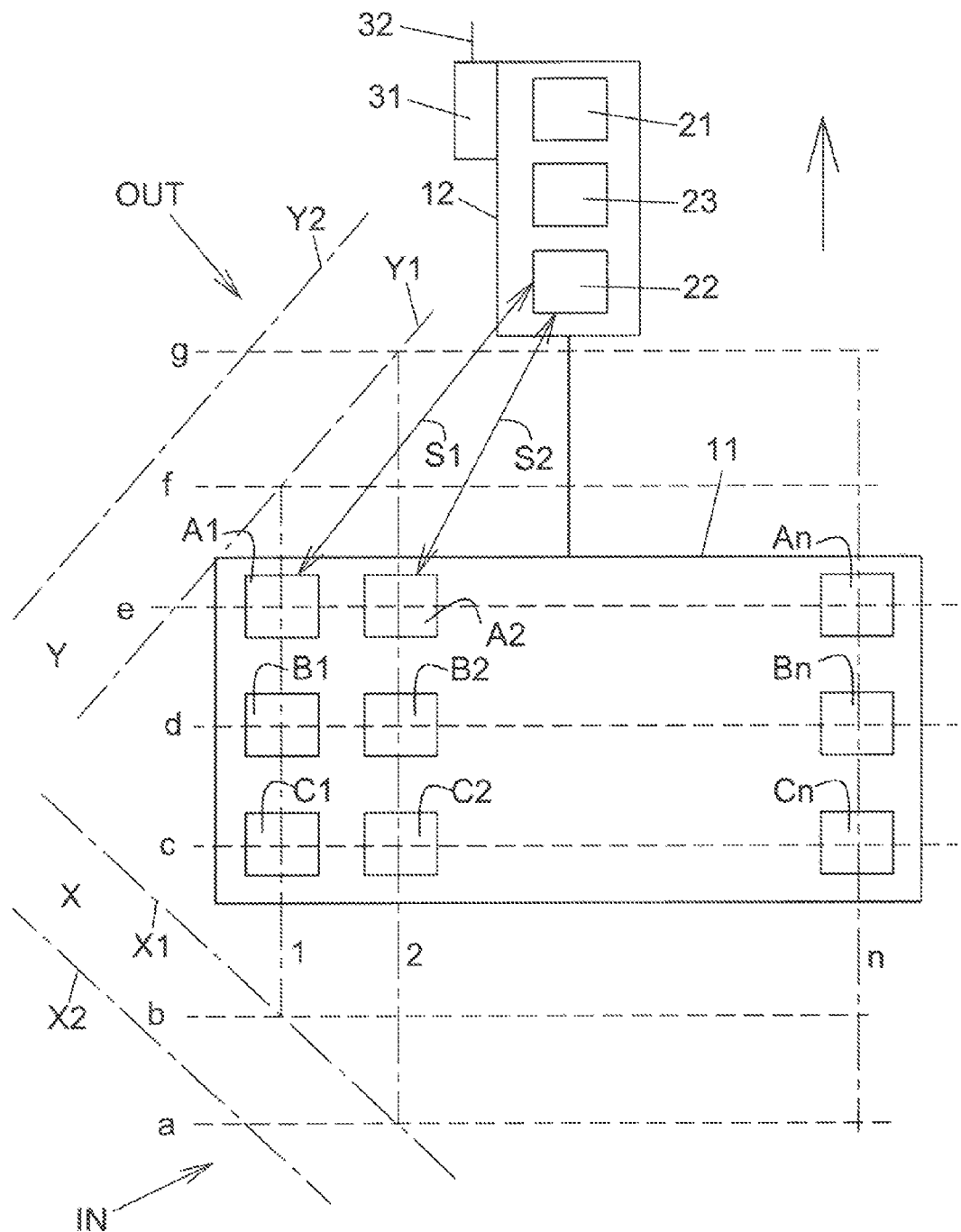
FIG. 3 shows an explanatory sketch according to a further general embodiment according to the invention.

FIG. 3 shows an additional embodiment of an agricultural machinery 11 according to the invention. This embodiment is extended with an additional main group A of metering devices A1, A2, An, which are in the form of fertilizer metering devices. The figure also shows the main group C, which are biocide agent metering devices C1, C2, Cn and the main group B, which are seed metering devices B1, B2, Bn. The metering devices are placed along metering rows 1, 2, n, which correspond to the drill rows of the seed metering devices. Along each metering row n, a metering device from each main group A, B, C is placed, so that the metering row 1 is served by the devices A1, B1, and C1, etc. Also embodiments having common metering devices for several rows are feasible. Above all, it may be suitable with common containers for fertilizer and/or biocide agent with the metering being carried out to one or more rows in common. The figure should be only schematically understood and shows that the metering devices are placed in straight rows, but are in reality often placed slightly laterally, i.e., sideways, displaced in relation to the metering row n, wherein the rows of the metered agents will be slightly separated from each other along the same metering row n. Furthermore, the metering devices are placed on lateral lines, which in the shown figure have been designated c, d, and e. Also this location may deviate slightly from the schematic figure.

The agricultural machinery 11 is towed by a tractor 12 in which a control and regulation equipment is placed, which comprises a dosage unit 21, a control unit 22 and a calculation unit 23 and also storage means for the metering devices and for the geometry of the area under cultivation and different soils and the positions thereof in the area. The equipment also comprises a GPS receiver 31 having an antenna 32. The GPS receiver is provided with information about the shape and position of the area under cultivation and connected to control and regulation equipment so as to, to the units thereof, transfer this information together with the current position in real-time of the agricultural implement and the metering devices thereof. The GPS receiver also co-operates with control and regulation equipment by storing present information about recently performed driving across the area under cultivation in question by storing previous metering rows, for instance during the last hour, in order to calculate, in such a way, when the metering rows of a new driving pattern will border to the last hour's covered metering rows. The units of this control and regulation equipment and the GPS receiver are, in the embodiment illustrated, placed in the tractor, but may just as well be placed in the agricultural machinery. In addition, some of the units may be placed in the tractor and some be placed in the agricultural machinery.

All these units are software-controlled to co-operate with each other according to predefined rules, which may be programmed by the operator. This co-operation results in a first signal S1 from the control unit 22 to, in the embodiment illustrated, the fertilizer metering device A1 when this arrives to the point f1, which is the point of intersection between the lateral line f and the metering row 1. This first signal S1 from the control unit 22 is a result of an activation signal to the control unit that is generated either manually by the tractor driver or automatically from the calculation unit 23 by the same, with the aid of stored data and real-time data in the GPS receiver and speed, having calculated the arrival of the point e1 to f1. In the figure, both the activation signals to the control unit and the execution signals from the control unit are shown as the two-way arrows S1 and S2. Theoretically seen, metering of biocide agent from A1 then ceases. In practice, there is a delay of this conveyance of agent, which delay also is taken into the consideration. Furthermore, this co-operation results in a second signal S2 from the control unit 22 to, in the embodiment illustrated, the fertilizer metering device A2 when this reaches the point g2, which is the point of intersection between the lateral line g and the metering row 2. This second signal S2 from the control unit 22 is also a result of an activation signal, which, as previously described, is generated either manually by the tractor driver or automatically from the calculation unit. Thus, the first and the second signal are control signals for the units A1 and A2 when these should stop the metering.

In the manual case, the calculation unit can, with the aid of these two signals S1, S2, calculate the inclination of the bordering metering row Y1 and the remaining metering devices A3-An of this main group A can be calculated in the same way and automatically receive the respective control signals.

In the automatic case, the inclination of the bordering metering row Y1 is already given and the control signals can be sent with the aid of the present information from stored data and real-time data.

The control unit 22 will send the corresponding control signals also to the main group B and the devices B1-Bn thereof when these reach the bordering metering row Y1 by corresponding calculations and in regard to the known distance between the lateral lines d and e as well as the factual speed of the agricultural machinery. In addition, the control unit 22 will send the corresponding control signals also to the main group C and the devices C1-Cn thereof when these reach the bordering metering row Y1 by corresponding calculations and in regard to the known distance between the lateral lines c and d as well as the factual speed of the agricultural machinery.

All these control signals will disable the metering from the metering devices by the agricultural machinery reaching the position "out from oblique surface", OUT. As shown in the lower part of the figure, a corresponding individual calculation takes place when the metering devices should start the metering by the agricultural machinery reaching the position "into oblique surface", IN. In this case, it is the bordering metering row X1 that determines when the different metering devices individually should start the metering.

In the embodiment examples shown, the fertilizer devices are defined by A, the seed devices by B, and the biocide agent devices by C.

In one embodiment, there is arranged a central common container for the fertilizer that provides for supply of agent to the individual metering devices A1-An for the fertilizer. Furthermore, there are "positioning devices", which for the fertilizer are a simple disc share and for the seed these are a traditional V-disc arrangement. The biocide agent has an outlet above or between drill furrow-closing inclined rear wheels. It is also the case that the outlets for the biocide agent at a given instant of time is at different positions in the field.

The invention claimed is:

1. An agricultural machine comprising:
a first group of metering devices including at least two electrically controlled metering devices, wherein the at least two electrically controlled metering devices are placed laterally in the agricultural machine so as to provide a number of parallel metering rows;
at least one control unit, wherein each one of the at least two electrically controlled metering devices is connected to the at least one control unit such that the at least one control unit individual controls each metering device;
a calculation unit connected to the at least one control unit;
wherein the at least one control unit is configured to:
receive a first signal that instructs the at least one control unit to either start or stop metering a first metering device of the at least two electrically controlled metering devices,
receive a second signal that instructs the at least one control unit to either start or stop metering a second metering device of the at least two electrically controlled metering devices,
individually control the start or the stop of each of the first metering device and the second metering device based on the first signal and the second signal; and
wherein the calculation unit is configured to, with the aid of a time of the first signal, a time of the second signal, and a speed of the agricultural machine, determine a start time or a stop time of the metering of each of the first metering device and the second metering device.

2. The agricultural machine of claim 1, wherein the first group of metering devices consists of seed metering devices.

3. The agricultural machine of claim 1, further comprising:
a second group of electrically controlled metering devices placed in front of or behind the first group of metering devices in relation to the direction of travel such that each of the number of parallel metering rows receives metering from the first group of metering devices and the second group of metering devices;
wherein the calculation unit is configured to, with the aid of the time of the first signal, the time of the second signal, the speed of the agricultural machinery, and a distance between the first group of metering devices and the second group of metering devices, calculates individual instants of time of start or stop of the metering each of the first group of metering devices and the second group of metering devices; and
wherein the at least one control unit individually executes the start or stop of the respective metering of said first group of metering devices and second group of metering devices.

4. The agricultural machine of claim 3, wherein the second group of metering devices consists of fertilizer metering devices.

5. The agricultural machine of claim 3, wherein the second group of metering devices consists of biocide agent metering devices.

6. The agricultural machine of claim 3, wherein each metering device of the first group of metering devices and the second group of metering devices provides for the metering to only one metering row of the number of parallel metering rows.

7. The agricultural machine of claim 3, further comprising a dosage unit that receives a dosage signal that depends on the speed of the agricultural machine from the at least one control unit, wherein the dosage unit is configured to regulate a delivered amount of an agent from the second group of metering devices in relation to the speed of the agricultural machine.

8. The agricultural machine of claim 7, wherein the dosage unit is controlled manually or automatically to increase or decrease the delivered amount of agent from the second group of metering devices independently of the speed of the agricultural machinery.

9. The agricultural machine of claim 8, wherein the dosage unit is automatically actuated for a generally higher or a generally lower metering based on received information about a location and a shape of an area under cultivation and a nature of a soil in co-operation with present data from a GPS receiver connected to the dosage unit.

10. The agricultural machine of claim 3, further comprising a third group of electrically controlled metering devices placed in front of or behind the first group of metering devices in relation to the direction of travel such that each of the number of parallel metering rows receives metering from the first group of metering devices, the second group of metering devices, and the third group of metering devices;
   wherein the second group of metering devices consists of biocide agent metering devices; and
   wherein the third group of metering devices consists of fertilizer metering devices.

11. The agricultural machine of claim 1, wherein the first and the second signal are sent manually for execution to the at least one control unit by an operator.

12. The agricultural machine of claim 1, wherein the first signal and the second signal are sent automatically for execution to the control unit from the at least one calculation unit after the calculation unit has calculated the start time or the stop time of each metering unit, wherein the calculation unit calculates the start time or the stop time with the aid of stored information about a location and a shape of an area under cultivation and with data from a GPS receiver.

13. The agricultural machine of claim 1, wherein at least one of the at least two electrically controlled metering devices is a singulation device for seeds.

14. The agricultural machine of claim 1, further comprising a vehicle configured to tow the first group of metering devices.

15. A method of performing an agricultural operation on an area of land, the method comprising:
   providing a first group of metering devices, wherein each of the first group of metering devices are individually controllable by a control unit, wherein the first group of metering devices are arranged to provide metering of a first object to a number of parallel rows when towed by a vehicle;
   towing the first group of metering devices with a vehicle;
   independently instructing, by the control unit, each of the first group of metering devices to provide the first object to a respective row of the number of parallel rows as the first group of metering devices is towed across the area of land;
   determining, by the control unit, that the first group of metering devices is going to cross a planting boundary at a non-perpendicular angle of intersection; and
   independently instructing, by the control unit, each of the first group of metering devices to stop providing the first object as each of the first group of metering devices passes over the planting boundary.

16. The method of claim 15, further comprising:
   providing a second group of metering devices, wherein the second group of metering devices are positioned behind the first group of metering devices with respect to a direction of travel of the vehicle, wherein the second group of metering devices are configured to provide metering of a second object to the number of parallel rows when towed by a vehicle;
   towing the second group of metering devices by the vehicle; and
   independently controlling, by the control unit, each of the second group of metering devices to provide the second object to a respective row of the number of parallel rows as the second group of metering devices is towed across the area of land.

17. The method of claim 16, further comprising:
   providing a third group of metering devices, wherein the third group of metering devices are positioned in front of the first group of metering devices with respect to the direction of travel of the vehicle, wherein the third group of metering devices are configured to provide metering of a third object to the number of parallel rows when towed by a vehicle;
   towing the third group of metering devices by the vehicle; and
   independently controlling, by the control unit, each of the third group of metering devices to provide the third object to a respective row of the number of parallel rows as the third group of metering devices is towed across the area of land.

18. The method of claim 17, wherein the first group of metering devices consists of seed metering devices and the first object is seeds; wherein the second group of metering devices consists of biocide metering devices and the second object is a biocide; and wherein the third group of metering devices consists of fertilizer metering devices and the third object is a fertilizer.

19. The method of claim 18, further comprising modifying, by a dosage unit coupled to the control unit, an amount of biocide delivered to the area of land.

20. The method of claim 15, further comprising calculating, by a calculation unit coupled to the control unit, a start metering time or a stop metering time for each of the first group of metering devices based at least in part on a determined speed of the vehicle, wherein the instructing steps are performed by the control unit in response to the calculated start metering time or stop metering time.

* * * * *